United States Patent [19]

Baran

[11] Patent Number: 4,497,848
[45] Date of Patent: Feb. 5, 1985

[54] STENCILLING A UNIQUE MACHINE-READABLE MARKING ON EACH OF A PLURALITY OF WORKPIECES

[75] Inventor: Anthony S. Baran, East Hempfield Township, Lancaster County, Pa.

[73] Assignee: RCA Corporation, New York, N.Y.

[21] Appl. No.: 546,513

[22] Filed: Oct. 28, 1983

[51] Int. Cl.³ .......................... B05D 5/12; B23K 9/00; B41C 1/14
[52] U.S. Cl. .................................. 427/106; 101/128.4; 219/121 LM; 427/282; 430/22; 430/23; 430/308; 430/945
[58] Field of Search .................... 427/53.1, 64, 65, 67, 427/106, 68, 272, 282; 430/22, 23, 308, 945; 101/128.4

[56] References Cited

U.S. PATENT DOCUMENTS

| | | |
|---|---|---|
| 2,625,734 | 1/1953 | Law ..................................... 29/25.13 |
| 3,212,949 | 10/1965 | Thompson ........................... 156/247 |
| 3,696,742 | 10/1972 | Parts et al. ......................... 101/128.4 |
| 4,216,019 | 8/1980 | Reed et al. .......................... 430/308 |
| 4,288,529 | 9/1981 | Sano et al. .......................... 430/308 |
| 4,323,755 | 4/1982 | Nierenberg ......................... 219/121 |
| 4,327,283 | 4/1982 | Heyman et al. ..................... 235/487 |
| 4,363,289 | 12/1982 | Gasser ........................... 101/128.4 X |
| 4,374,451 | 2/1983 | Miller ................................. 445/22 |

Primary Examiner—Michael R. Lusignan
Attorney, Agent, or Firm—E. M. Whitacre; D. H. Irlbeck; L. Greenspan

[57] ABSTRACT

Method and apparatus are described for producing a unique machine-readable marking, such as a bar-code marking, on each of a succession of workpieces, such as glass envelope parts of cathode-ray tubes. The method comprises producing and applying a different unique stencil for each workpiece and then applying a suitable paint through the stencil.

20 Claims, 6 Drawing Figures

STENCILLING A UNIQUE MACHINE-READABLE MARKING ON EACH OF A PLURALITY OF WORKPIECES

BACKGROUND OF THE INVENTION

This invention relates to a novel method for producing a unique machine-readable marking on each of a plurality of workpieces. The novel method is particularly useful for producing unique bar-code markings on glass parts for cathode-ray tubes.

U.S. Pat. No. 4,374,451 issued Feb. 22, 1983 to W. R. Miller discloses a method for assembling parts of a CRT (cathode-ray tube) that includes providing at least one CRT part, such as the glass faceplate panel, having a unique machine-readable marking, such as a bar-code marking, on an external surface thereof. The marking is read one or more times by machine during the assembly of the CRT. Each time it is read, a control signal is generated in response to the reading, and then the signal is used to initiate a local process for action with respect to the tube part. The local process may be one or more of selecting and assembling another part to the workpiece, a series of processing steps applied to the workpiece, a recording of historical data, etc. The marking must be made reliably at low cost, must be readable reliably at low cost, and must survive the hostile environments of subsequent processing.

U.S. Pat. No. 4,327,283 issued Apr. 27, 1983 to P. M. Heyman et al. discloses a workpiece with a desired unique machine-readable marking recessed therein. That marking may be made by depositing a coating on a surface portion of the workpiece, and then selectively removing, as by abrasion or ablation, defined areas through the coating. The marking is then read to verify that the desired mark has actually been produced. It is desirable to provide an alternative method for producing such unique machine-readable markings, especially a method which may require less process control and can produce markings at lower cost with equivalent or better reliablity.

SUMMARY OF THE INVENTION

The novel method for producing a desired unique machine-readable marking on each of a plurality of workpieces includes producing a stencil of the marking, preferably in a strip of sheet material, contacting the stencil with a surface of the workpiece, depositing coating material or paint on the surface through the stencil to define said marking on the surface, and repeating the foregoing steps using a different stencil on a different one, and only one, of each of the other of the plurality of workpieces.

The stencils may be made sequentially on sheet stencil material in the form of cards or a strip in advance of producing the markings on the workpieces, or may be made intermittently with, or simultaneously with, producing the marking on the workpiece. The stencils may be made by any method; for example, mechanically as by incising the stencil material or pyrolytically, as by controllably burning the stencil material with a focused laser beam, or photographically by using photoinsolubilizable or photosolubilizable strip material. Before the coating material is applied, the stencil may be read to verify that it will produce the desired marking. The coating material may be applied through the stencil by spraying, pad transfer or other coating method. After the coating is applied, the stencil is removed and may be thrown away. The stencilled coating material produces a dry marking that contrasts in reflectance with the surface to which it is applied.

DETAILED DESCRIPTION OF THE PREFERRED EMBODIMENTS

Figure 1:
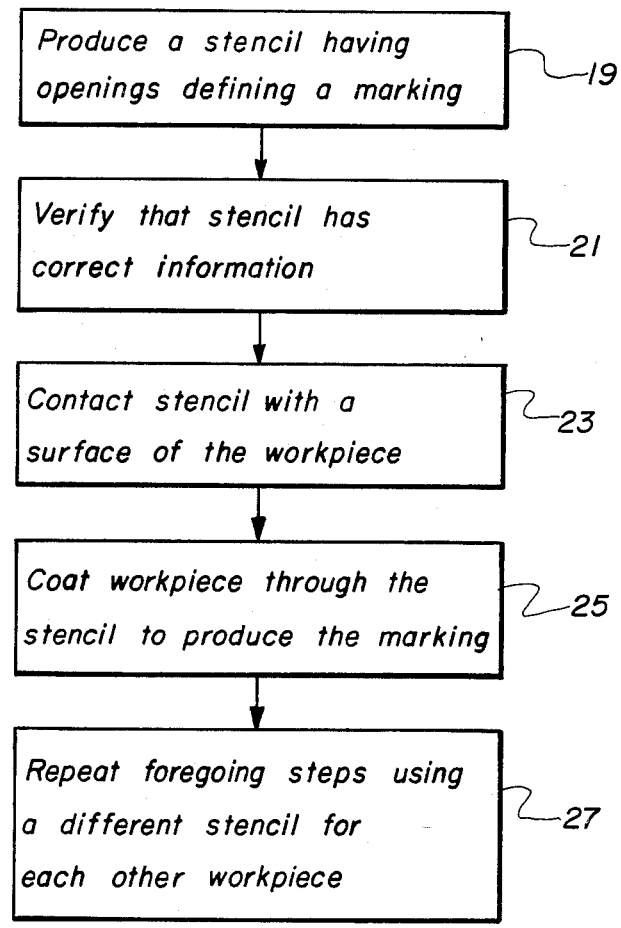
FIG. 1 is a flow-sheet diagram illustrating the novel method.

The flow-sheet diagram shown in FIG. 1 includes all of the essential steps in the novel method. The method contemplates producing a different, unique machine-readable marking on each of a plurality of workpieces. To this end, a disposable stencil of each unique marking is made for each workpiece. Each stencil is designed for one use, and, as shown by the box 19, each stencil has openings therethrough defining the desired marking. Optionally, the stencil is read to verify that it will produce the desired marking as shown by the box 21. Each stencil is positioned in contact with the surface of a workpiece, as indicated by the box 23, and the workpiece is coated through the stencil to produce the marking, as indicated by the box 25. The steps are repeated for each workpiece as indicated by the box 27.

It is acknowledged that stencilling is old and also that applying a machine-readable marking, such as a bar code, to a workpiece is old. The problem here is to apply a different unique machine-readable marking to each of a plurality of workpieces. In the novel method, unlike prior stencilling methods, a succession of different stencils is made each for a single use on one and only one of the workpieces. Unlike prior marking methods, the marking produced by the novel method may be verified in the stencil before the marking is deposited on the workpiece. Any type of machine-readable marking may be produced on any plurality of workpieces.

The following detailed description discloses producing bar-code markings on glass-envelope parts of cathode-ray tubes in furtherance of the technology disclosed in the above-cited patents to Miller and Heyman et al. However, unlike the methods described therein, the novel method does not form the bar code by selectively removing portions of a coating on a workpiece, and does not initially form the pattern of marking on the surface of the workpiece. Instead the novel method forms the pattern on a disposable, one-use stencil which is then used to produce the desired marking on the desired workpiece.

The stencil may be made from sheet stencil material, such as paper, plastic or metal, in the form of strips or cards. The marking pattern may be cut, or punched, or scribed mechanically or with a focused laser beam, or may be made photographically, or by any other known method in the art. The sheet material may include a mesh if the method of paint application is by squeegee. The preferred stencil material is a fibrous material having relatively high wet strength.

In one embodiment, a high-energy laser, such as $CO_2$ or pulsed neodymium-YAG laser, is used to burn openings, which may be the narrow and wide white bars of a bar code or other identifying logos or alphanumerics, through thin sheet material (paper plastic, or other suitable material) such that the resulting sheet material forms a stencil. Any of several laser-deflection schemes may be used to burn the stencil, including combinations of the stencil-strip movement, laser-beam movement, and movement of the stencil material in an X-Y plane. Additionally, moving the stencil material along the Z-axis will change the effective diameter of the laser beam (for a focused laser beam) and thus provide control for changing the widths of bars in a bar-code marking or alphanumeric font size. The laser beam is used to completely burn through the stencil material. At that point in the process, the laser beam is not incident on the workpiece so the workpiece is not subject to damage, such as glass spalling, as is the case when a focused laser is used to ablate a bar code through a coating on a glass workpiece.

Figure 2:
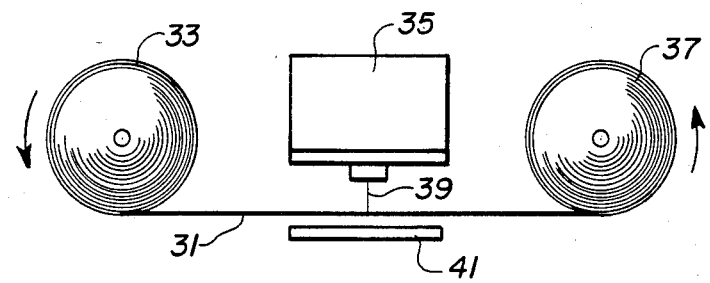
FIG. 2 is an elevational view illustrating the use of a laser beam for producing a succession of stencils on a strip of sheet material according to the novel method.
Figure 3:
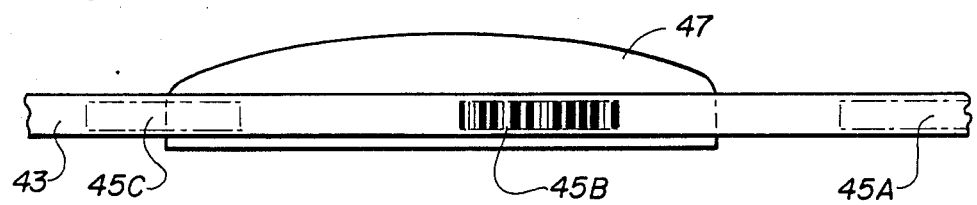
FIG. 3 is an elevational view of a stencil, positioned longitudinally on a strip, contacting the surface of a workpiece.
Figure 4:
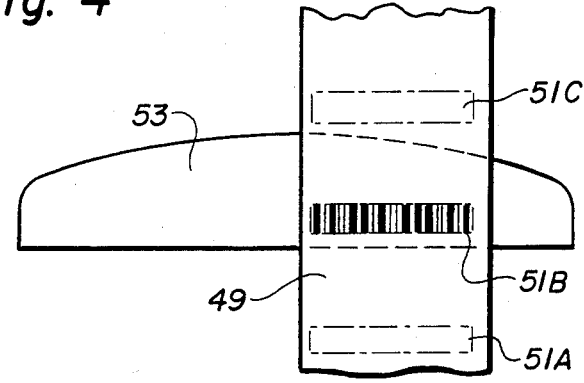
FIG. 4 is an elevational view of a stencil, positioned transversely on a strip, contacting the surface of a workpiece.

FIG. 2 shows a preferred method for scribing the marking pattern on a strip 31 of paper. The strip 31 is unwound from a supply roll 33, passes under a laser-beam-generating apparatus 35 and is rewound on a takeup roll 37. The apparatus 35 generates a focused beam 39 of such concentration as to burn sharply-defined slots of one-unit and three-unit widths which comprise the marking pattern completely through the strip 31. An energy-absorbing backup plate 41 absorbs any of the laser-beam energy that passes through the strip 31. A typical pattern is about 3.5 inches long and about 0.75 inch high, with slots that are about 0.75 inch high and about 0.025 or 0.075 inch wide spaced apart by the same two widths. The pattern may be oriented longitudinally on the strip 31 as shown in FIG. 3 or transversely as shown in FIG. 4.

The unique stencils can be manufactured off line at a continuous but slower rate than the flow rate of the workpieces and this permits the laser beam to burn large and complex markings with a slower laser-spot velocity and lower laser energy. For example, laser ablating a 12-digit interleaved 2-of-5 bar code that measures about 0.75 inch high and about 3.5 inches long and includes the appropriate start and stop characters will saturate the capacity of a conventional laser-ablation system when the through-put capacity approaches 400 units per hour.

After each stencil has been prepared and before it is used, it is read to verify that it will produce by the subsequent stencilling method the desired marking. This is done by reading the stencil and comparing the reading with the information input to the stencil-making device. As an example, a stencil is prepared for depositing white bars of coating material. The stencil openings are scanned with a light beam on one side. A photo detector on the other side of the stencil picks up the transmitted light and generates a signal which is compared with the input signal to the stencil-making device. Stencils which produce a signal that does not properly compare can be rejected, for example, by applying a suitable reject mark or hole to instruct the subsequent applicator to pass the stencil without use, or by instructing the device to produce another stencil, or both.

After the stencils have been prepared, each stencil in turn is positioned on a different workpiece. If the stencil is in a card, it is placed in a card holder and positioned. If the stencil is in a strip, the strip may be stretched over the surface of the workpiece. As shown in FIG. 3, a strip 43 has a succession of longitudinally-oriented stencils 45A, 45B and 45C. The first stencil 45A has been used. The second stencil 45B is positioned for coating in contact with the surface of a faceplate panel 47. The third stencil 45C is to be used on the next panel (not shown). The strip has a small amount of longitudinal tension applied so that it is taut and in firm contact with the panel 47.

As shown in FIG. 4, a strip 49 has a succession of transversely-oriented stencils 51A, 51B and 51C. The first stencil 51A has been used; the second stencil 51B is positioned for coating in contact with the surface of a panel 53; and the third stencil 51C is to be used on the next panel. Because of the transverse orientation of the stencils, the strip 49 is positioned and moved vertically instead of horizontally as shown in FIG. 3. Also, because of the transverse orientation of the stencils, a greater longitudinal tension can be applied to the strip 49 than can be applied to the strip 43 shown in FIG. 3, while the strip 49 is stretched over and in contact with the panel 53.

With the stencil in contact with the panel, for example, as shown in FIGS. 3 and 4, paint is applied to the panel surface through the stencil to produce a coating in the pattern in the stencil. The paint can be any desired coating material. It is preferred to use a coating material which, after curing, is stable at temperatures up to about 450° C. But this is not necessary for the purposes of the novel method. It is necessary that the coating, after curing, has a contrasting reflectance with respect to the surface of the workpiece. In the case of a light-transmitting glass workpiece surface, the cured coating can be light reflecting (white, for example) or light scattering. Some suitable paints are disclosed in the above-cited Heyman et al. patent. The paint may be applied by spraying, or by rolling on, or by transfer printing using a pad. Alternatively, the marking may be constituted in place by applying a tacky binder through the stencil and then dusting a powdered pigment on the stencilled binder pattern before or after the stencil is removed.

The stencil is removed from the workpiece, and the remaining patterned coating material, for example, may represent the wide and narrow white bars of a bar code. The absence of white represents the wide and narrow black bars of the bar code. If a light-absorbing (black) background is required, it may be deposited as a continuous coating before depositing the stencilled white coating. The coating materials remaining on the workpiece are hardened as required (e.g., UV-cured, baked, dried, washed). For producing a black marking on a white background, the coating colors are reversed from what is described above. Also, if necessary, the stencil may be the negative of what is described above.

Figure 5:
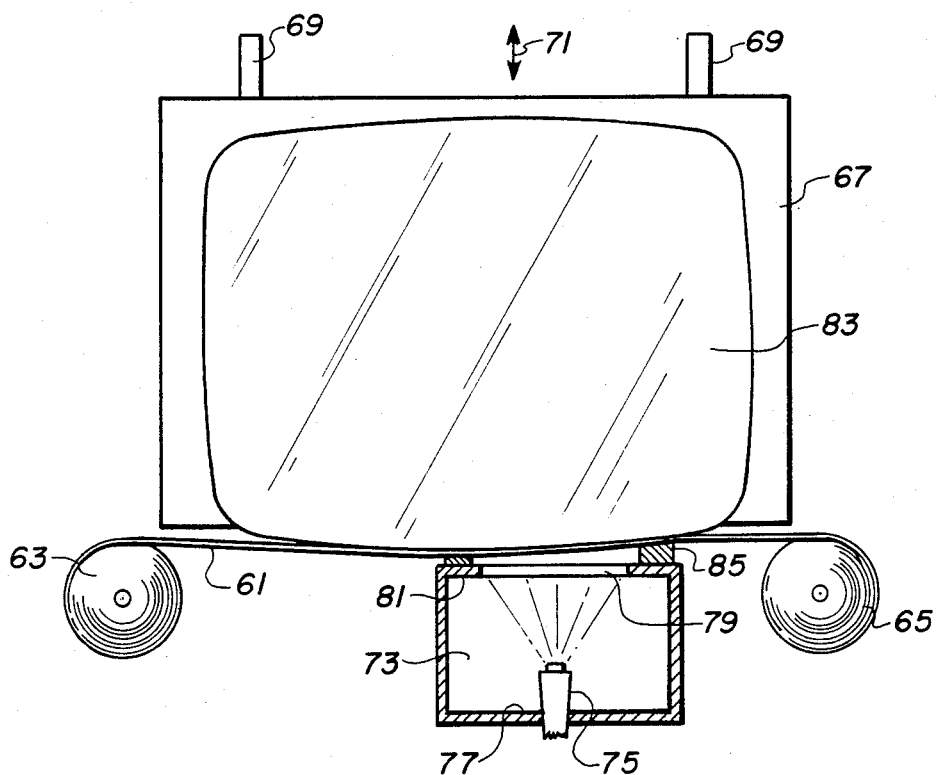
FIG. 5 is a plan view, partially broken away, of a workpiece being spray coated through the contacting stencil.

FIG. 5 shows an apparatus which can carry out the contacting and coating steps of the novel method. The apparatus comprises means for holding a strip 61 in longitudinal tension between a supply roll 63 and a takeup roll 65. The strip 61 has longitudinally-oriented stencils therein (as shown in FIG. 3). The apparatus includes a table 67 that is movable on tracks 69 toward and away from one side of the strip 61 as shown by the arrow 71. A stationary chamber 73 has a spray nozzle 75 in the furtherest wall 77 facing the strip 61, and an opening 79 about the size of the stencil in the nearest wall 81 to the strip 61. In operation, the strip 61 is moved to place the desired stencil in position opposite the opening 79. A panel 83 is placed on the table 67, with one side overhanging the table. The table 67 and the panel 83 are now moved into the strip 61, pressing the strip against the panel surface on one side and against a spongy gasket 85 on the outside of the nearest wall 81. The stencil and surface are now sprayed with coating material from the nozzle 75. After the spraying is stopped, the table 67 and panel 83 are retracted whereby, because of the tension in the strip 61, the strip 61 separates from the gasket 85, and the panel 83 separates from the strip 61.

If the strip 61 has transversely-oriented stencils therein (as shown in FIG. 4), the apparatus shown in FIG. 5 is modified so that the strip feeds from above to below as shown in FIG. 4, instead of from side to side as shown in FIG. 3. That requires the feed roll 63 to be positioned above the chamber 73 and the takeup roll 65 to be positioned below the chamber 73.

In either case, the panel 83 with the marking thereon is removed from the table 67, and another panel placed thereon. The strip 61 is moved to position the next stencil for contacting with that panel. Then, the cycle is repeated with another panel. In the arrangement shown in FIG. 5, the spray chamber is stationary, the panel is loaded manually on the table and the panel moves into the strip and chamber.

Figure 6:
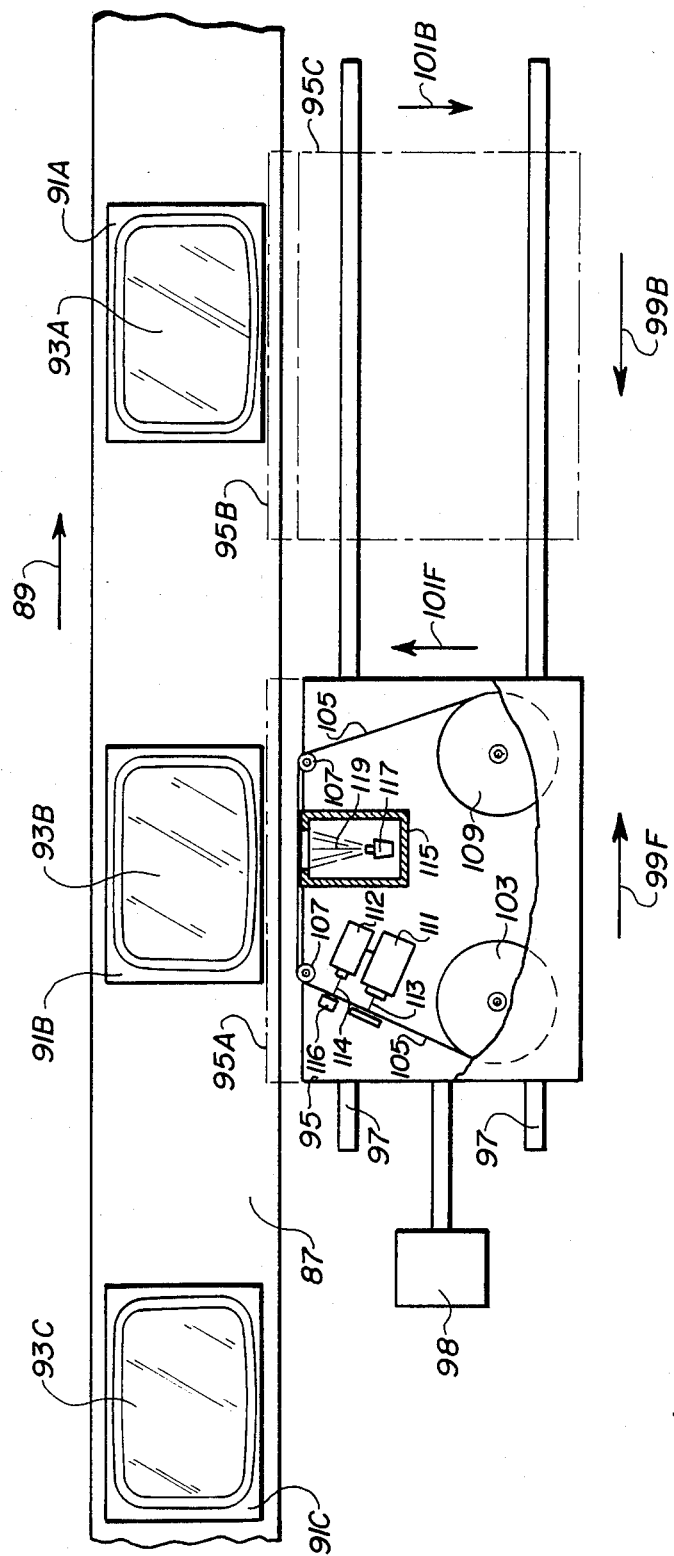
FIG. 6 is a plan view, partially broken away, of an apparatus which can perform all of the steps of the novel method in a coordinated manner.

FIG. 6 shows an apparatus wherein a spray chamber and a positioned stencil, supported on a common platform, move into contact with, and follow the surface of, a panel moving on a conveyor during the cycle time for producing the marking. Also, the stencil is made on demand on the same platform. The apparatus shown in FIG. 6 comprises a conveyor belt 87 moving at a substantially constant rate in the direction shown by the arrow 89. The belt 87 carries a succession of pallets 91A, 91B and 91C, each having a panel 93A, 93B and 93C respectively thereon, with its face down and its seal land facing up. Alternatively, the seal land may face down. Adjacent to the belt 87 is a platform 95 mounted on tracks 97 in such a manner that the platform 95 can be moved by the parallel-moving means 98 in directions substantially parallel to the movement of the belt 87 as shown by the arrows 99F and 99B. Also present is a transverse-moving means (not shown) for moving the platform 95 towards and away from the belt 87 as shown by the arrows 101F and 101B respectively.

Mounted on the platform 95 are a supply roll 103 of sheet stencil material in the form of a strip 105, two guide rollers 107 for guiding a portion of the strip 105 in a direction substantially parallel to the direction of movement of the belt 87, and a take-up roll 109 for accumulating used stencils. Between the supply roll 103 and the guide rollers 107 is a laser means 111 for producing a stencil in the strip 105 on demand with a laser beam 113, similar in character and function to the equipment described with respect to FIG. 2 above. Between the laser means 111 and the guide rollers 107 is a stencil reader comprising a means 112 for producing a scanning light beam 114 and a photo detector 116 whose output is connected by means (not shown) to the laser means 111. Between the two guide rollers 107 is a spray chamber 115 having a nozzle 117 therein for producing a spray 119 of paint on demand.

The apparatus shown in FIG. 6 can continuously carry out all of the operations shown in FIG. 1 in the following manner. The conveyor belt 87 carries a succession of panels past the platform 95. As shown, a cycle is about to begin for applying a unique marking to the second panel 93B. The first panel 93A has had its unique marking applied, and the third panel 93C will receive its unique marking after the present cycle is completed. During the present cycle, the laser means 111 is activated to produce the third stencil for the third panel 93C. The second stencil for the second panel which was made during the previous cycle is now in position between the guide rollers 107 and between the spray chamber 115 and the second panel 93B. The platform 95 is moved forward as shown by the arrow 101F to the position indicated by the first phantom line 95A so that the stencil contacts the surface of the second panel 93B. With the stencil contacting the second panel, the platform 95 moves with the second panel 93B in the direction shown by the arrow 99F by the parallel moving means 98 to the position shown by the second phantom line 95B. During this movement, paint is sprayed through the nozzle 117, coating the second panel 93B and the contacting stencil. At the position shown by the second phantom line 95B, the spraying is completed. The platform 95 then moves transversely away from the second panel in the direction shown by arrow 101B to the position shown by the third phantom line 95C, taking the stencil and strip 105 out of contact with the second panel 93B (which has now moved almost to the position of the first panel 93A in FIG. 6). The platform 95 now moves parallel to the belt 87 in the direction shown by the arrow 99B to the starting position shown in FIG. 6 by the parallel moving means 98. The strip 105 is advanced so that the third stencil for the third panel is in position between the guide rollers 107 to start the next cycle. During the advance of the strip 105, the third stencil is read by the stencil reader, and the signal produced by the photo detector 116 is compared with the input signal to the laser means 111. A proper comparison passes the stencil for completion of the cycle. A rejected comparison stops the cycle, advances the strip and another stencil is made.

Each stencil is used only once and is fed from a take-up reel or fan-folded stack. Verification of the desired information, for example, bar-code digits, could be performed first on the manufactured stencils and second on the stencilled workpiece (as in the prior practice). The approach shown in FIG. 6 can be modified to make and use transversely-oriented stencils by feeding the strip 105 vertically from above to below the spray chamber 115.

What is claimed is:
1. A method for producing a different machine-readable marking on each of a plurality of workpieces comprising
   A. producing a stencil having openings therein for defining a desired machine-readable marking,
   B. contacting said stencil with a surface of said workpiece,
   C. coating said surface with coating material through said stencil, said stencil defining the marks of said marking and
   D. repeating steps A, B and C including contacting a different stencil defining a different desired machine-readable marking on a different one, and only one, of each of the other of said plurality of workpieces.

2. The method defined in claim 1 wherein said machine-readable markings are bar-code markings, and said method includes, prior to step C, verifying that said stencil is for said desired marking.

3. The method defined in claim 1 wherein step A includes burning a bar code into sheet material with a laser beam to produce said stencil.

4. The method defined in claim 1 wherein step A includes incising a bar code into sheet material with mechanical means to produce said stencil.

5. The method defined in claim 1 wherein step A includes providing a layer or sheet of photosolubilizable material or photoinsolubilizable material, photoexposing said layer or sheet to a bar-code pattern of actinic radiation until said layer or sheet is adequately exposed, and then developing said exposed layer or sheet to produce said stencil.

6. The method defined in claim 1 wherein said stencil is in a card having one stencil pattern therein.

7. The method defined in claim 1 wherein a plurality of stencils is in a strip of sheet material, said stencils being arranged sequentially along the length thereof.

8. A method for producing a machine-readable bar-code marking on each of a plurality of workpieces comprising
   A. providing a strip of sheet material,
   B. producing a sequentially-arranged succession of bar-code stencils in said strip,
   C. advancing said plurality of workpieces one by one,
   D. contacting each of said advancing plurality of workpieces with a different one of said succession of stencils,
   E. and then, for each of said workpieces, applying paint through the stencil applied thereto onto said workpiece, and then removing said stencil.

9. The method defined in claim 6 wherein said markings are arranged longitudinally on said strip.

10. The method defined in claim 6 wherein said markings are arranged transversely on said strip.

11. The method defined in claim 6 wherein step E includes applying longitudinal tension to said strip.

12. The method defined in claim 1 wherein said strip is composed essentially of fibrous material having a high wet strength.

13. A method for depositing a different desired bar-code marking on each of a plurality of glass workpieces comprising
   A. providing a strip of sheet material,
   B. using a focused laser beam, burning openings through said strip to produce a plurality of stencils for stencilling said desired bar-code markings, said stencils being in a sequential arrangement in said strip,
   C. verifying that said stencils are for said desired markings,
   D. advancing a succession of workpieces to which a bar-code marking is to be applied.
   E. contacting one of said stencils with the surface of one of said succession of workpieces,
   F. applying paint through the openings in said stencil while it is contacting said surface,
   G. removing said stencil from said surface,
   H. and repeating steps E, F and G for each of the remaining plurality of workpieces using a different one of said plurality of stencils for each workpiece.

14. The method defined in claim 13 wherein said workpiece is a glass envelope part for a cathode-ray tube.

15. The method defined in claim 13 wherein said paint is applied by spraying.

16. The method defined in claim 13 wherein said paint is applied by squeegeeing.

17. The method defined in claim 13 wherein said paint is applied by transfer from the surface of a pad.

18. The method defined in claim 13 including conveying said workpieces in a single file along a first prescribed path and, at steps E, F and G, moving said stencil in substantially constant positioned contact with said surface.

19. The method defined in claim 18 including conducting said strip along a second prescribed path, at least a portion of which is substantially parallel to said first prescribed path, and conducting steps E, F and G while said stencil is located in said parallel portion of said second path.

20. The method defined in claim 19 wherein the means for conducting said strip and the means for carrying out steps B and F are supported from a common platform, step E includes moving said platform toward said first path until said stencil contacts said workpiece, step F includes moving said platform in such manner as to maintain said stencil in constant positional contact with said workpiece, and step G includes moving said platform away from said first path.

* * * * *